US012583094B2

(12) United States Patent
Laible

(10) Patent No.: US 12,583,094 B2
(45) Date of Patent: Mar. 24, 2026

(54) CONTACTLESS LOCKING OF RATCHET COLUMNS

(71) Applicant: MTS MASCHINENBAU GMBH, Mengen (DE)

(72) Inventor: Eckhard Laible, Leinfelden-Schlechtenmühle (DE)

(73) Assignee: MTS MASCHINENBAU GMBH, Mengen (DE)

( * ) Notice: Subject to any disclaimer, the term of this patent is extended or adjusted under 35 U.S.C. 154(b) by 276 days.

(21) Appl. No.: 18/360,328

(22) Filed: Jul. 27, 2023

(65) Prior Publication Data

US 2024/0033896 A1 Feb. 1, 2024

(30) Foreign Application Priority Data

Jul. 28, 2022 (DE) ..................... 10 2022 118 994.5
Feb. 17, 2023 (DE) ..................... 10 2023 103 967.9

(51) Int. Cl.
*B25H 3/04* (2006.01)
*H01F 7/02* (2006.01)

(52) U.S. Cl.
CPC ................. *B25H 3/04* (2013.01); *H01F 7/02* (2013.01)

(58) Field of Classification Search
CPC .... H01F 7/02; B25H 3/04; B65G 1/14; B65G 57/03; A47F 7/0042
See application file for complete search history.

(56) References Cited

U.S. PATENT DOCUMENTS

| | | | | |
|---|---|---|---|---|
| 3,384,266 A * | 5/1968 | Schuller | A47F 1/04 | 221/90 |
| 4,572,382 A * | 2/1986 | Niederprum | B65G 1/14 | 108/134 |
| 4,712,691 A * | 12/1987 | Grill | B65G 1/14 | 211/49.1 |
| 5,005,712 A * | 4/1991 | Niederprum | A47F 7/0042 | 53/244 |
| 5,217,121 A * | 6/1993 | Walker | B65G 1/14 | 211/59.4 |
| 5,301,824 A * | 4/1994 | Schoeller | B65G 1/14 | 211/59.4 |
| 5,373,756 A * | 12/1994 | Schoeller | B65G 1/14 | 428/908.8 |

(Continued)

FOREIGN PATENT DOCUMENTS

| | | | |
|---|---|---|---|
| DE | 10249629 A1 * | 5/2004 | B65G 1/14 |
| DE | 202020104669 U1 * | 2/2021 | B65G 1/14 |

(Continued)

*Primary Examiner* — Patrick D Hawn
(74) *Attorney, Agent, or Firm* — Bachman & LaPointe, P.C.

(57) ABSTRACT

In an automatically operable rack for storing workpieces in ratchet columns with side walls (1.1, 1.2), between which movable ratchets (5) are arranged which serve to hold the workpieces, wherein the ratchets (5) can be brought from a rest position into a working position in which they hold the workpiece, and a locking/unlocking unit is assigned to the last ratchet (5.2), the locking being affected by a rotary movement of the last ratchet (5.2) into its working position, the rotary movement of the last ratchet (5.2) entrains a bolt (9) which is received by a recess (12, 49) when the working position is reached.

25 Claims, 8 Drawing Sheets

(56) References Cited

U.S. PATENT DOCUMENTS

Figure 1:
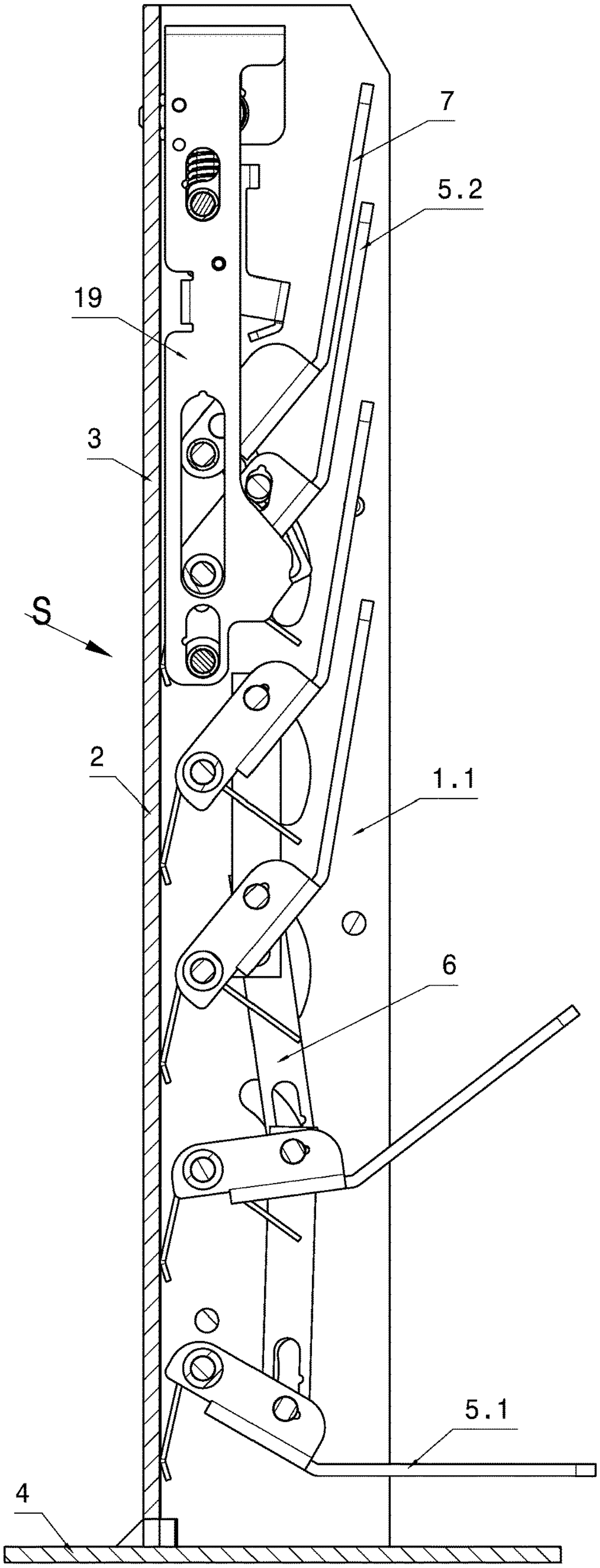

| | | | | | |
|---|---|---|---|---|---|
| 5,411,234 | A * | 5/1995 | Schoeller | B65G 1/14 | 254/89 H |
| 5,938,051 | A * | 8/1999 | Scholler | B65G 1/14 | 211/59.4 |
| 5,988,777 | A * | 11/1999 | Schoeller | B65G 1/14 | 312/190 |
| 6,223,911 | B1 * | 5/2001 | Weaver | B65G 1/14 | 211/150 |
| 6,405,883 | B1 * | 6/2002 | Schambach | B65G 1/14 | 211/59.4 |
| 7,070,058 | B2 * | 7/2006 | Strobel | B65G 1/14 | 211/150 |
| 7,210,892 | B2 * | 5/2007 | Strobel | B65G 1/14 | 414/794.9 |
| 7,347,654 | B2 * | 3/2008 | Mondejar Jimenez | B65G 1/14 | 410/43 |
| 7,878,343 | B2 * | 2/2011 | Strobel | B65G 1/14 | 211/150 |
| 9,022,371 | B2 * | 5/2015 | Seghezzi | B65G 1/14 | 248/304 |
| 10,280,002 | B2 * | 5/2019 | Giachero | B65G 1/14 | |
| 10,829,318 | B2 * | 11/2020 | Kreft | A47F 7/0014 | |
| 11,111,078 | B2 * | 9/2021 | Laible | B65G 1/14 | |
| 12,084,101 | B2 * | 9/2024 | Jung | B62B 3/005 | |
| 12,310,517 | B2 * | 5/2025 | Laible | A47F 7/0007 | |
| 12,319,330 | B2 * | 6/2025 | Laible | B65G 1/14 | |
| 2024/0278994 | A1 * | 8/2024 | Laible | B65G 1/14 | |

FOREIGN PATENT DOCUMENTS

| | | | | |
|---|---|---|---|---|
| DE | 202021106662 | U1 * | 12/2021 | B65G 1/14 |
| DE | 102021212591 | A1 * | 5/2023 | B65G 1/14 |
| DE | 102024104243 | A1 * | 8/2024 | B65G 1/14 |
| DE | 102024104302 | A1 * | 8/2024 | B65G 1/14 |
| DE | 202024105787 | U1 * | 10/2024 | B65G 1/14 |
| EP | 0510405 | A1 * | 10/1992 | B65G 1/14 |
| EP | 1340697 | A1 * | 9/2003 | B65G 1/14 |

* cited by examiner

CONTACTLESS LOCKING OF RATCHET COLUMNS

CROSS-REFERENCE TO RELATED APPLICATIONS

This application claims priority to German Patent Application Nos. DE 10 2022 118 994.5 filed Jul. 28, 2022 and DE 10 2023 103 967.9 filed Feb. 17, 2023, the contents of which are incorporated herein by reference in their entireties.

The invention relates to a rack for storing workpieces in ratchet columns with sidewalls, between which movable ratchets are situated, which serve to hold the workpieces, wherein the ratchets can be brought from a rest position into a working position, in which they hold the workpiece, and a locking/unlocking unit being assigned to the last ratchet, wherein the locking is performed by a rotary movement of the last ratchet into its working position.

PRIOR ART

Racks of this type with stacking columns are used in particular in the automotive industry to temporarily store sheet metal parts, which come from a molding plant and have to be transported for further processing. However, this is only an example. Thereby, there are vertical stacking columns but also horizontal ones, which are also subject to the present invention. Today, one problem is presented in particular by the handling of such racks or stacking columns. On the one hand, they are supposed to be able to be loaded, transported and unloaded fully automatically, for example by robots. Furthermore, they are supposed to take up as little space as possible.

For loading such racks, the ratchets, which are connected to each other in such a way that they are moved from a rest position to a working position during loading, have proven very successful. This usually begins by placing a workpiece on the lowest ratchet, which then rotates the lowest ratchet into the working position. This rotation causes the lowermost ratchet to take the next ratchet into a stand-by position, in which it can pick up the next workpiece. When the next workpiece is picked up, the subsequent ratchet is rotated into the stand-by position.

Depending on the design of the workpiece, three or more such racks are usually required, which together form a transport rack. To ensure that the ratchets are fixed during transport and do not move vertically together with the workpieces, the uppermost ratchet is usually locked. For this purpose, for example, a corresponding rack is described in the EP 1 263 665 B 1, in which the locking surface has a thrust element and this thrust element is assigned to a ratchet clearance surface of the last ratchet and can be guided along a side wall against the ratchet clearance surface. This thrust element is connected to a slider on the side wall, wherein a guide block is placed on the slider. This is a horizontally situated stacking column, in which the protruding lateral parts of the locking unit can have a disturbing effect. Something similar is also known from the EP 2 004 523 B 1.

OBJECT

The object of the present invention is to design the locking mechanism of the last ratchet to be as simple and easy to operate as possible, thereby taking up as little space as possible.

SOLUTION OF THE OBJECT

The solution to the object is that with the rotary movement of the last ratchet entrains a bolt, which is received by a recess when the working position is reached.

Thereby, a main focus of the present invention is that the locking itself is performed by the last ratchet, namely by its rotary movement into the working position. This can thereby be the last support ratchet or also a hold-down ratchet assigned to it. During this rotary movement, the last ratchet (hold-down ratchet) entrains a bolt, which, when it reaches a working position, is received by a recess in which a rotary movement of the ratchet is prevented.

In a first embodiment of the invention, the locking/unlocking unit is designed in such a way that it or the corresponding functional elements are situated on a rack part that can be attached to or placed on the stacking column from the outside. This opens up the possibility of also equipping stacking columns already on the market with a corresponding locking/unlocking unit. All that is required is to assign a bolt to the last ratchet or to the hold-down ratchet assigned to the last ratchet, which passes through at least one side wall and is guided in this side wall in a slotted link, which at least partially rotates around an axis of rotation of the last ratchet or of the hold-down ratchet. This bolt then engages in the locking/unlocking unit attached from the outside and interacts with it.

In this embodiment, the recess for receiving the bolt is formed in a latch that is rotatably assigned to the locking/unlocking unit. The rotation of this bolt preferably takes place against a force accumulator, for example against a helical spring, which is connected to the bolt at one end of the axis of rotation and at the other end has a connection to the rack part.

At the other end of the axis of rotation, the bolt has a connection to a lever strip, wherein this connection at least partially overlaps the slotted link in the side wall, so that the recess of the latch, which is provided between the connection and the axis of rotation, overlaps the bolt in the slotted link in its latch position. When the bolt moves in the slotted link, it hits an inclined surface of the latch so that it deflects this latch to such an extent that the latch clears the slotted link and the bolt can be guided to the end of the slotted link. At the end of the slotted link, the latch snaps back under the pull of the above-mentioned force accumulator and engages over the bolt, which is retracted into the recess of the latch.

Furthermore, the connection is supposed to be connected to a lever strip, wherein the connection is made by a small pin on the connection engaging into a small elongated hole on the lever strip. This has the advantage that the lever strip can move relative to the connection in the context of this elongated hole.

At the other end, the lever strip is connected to a toggle lever via a swivel joint. This toggle lever, in turn, is situated stationary and rotatable on the rack part, wherein an axis of rotation is intended for this purpose. The toggle lever can thereby pivot from a position above the axis of rotation to a position below the axis of rotation. Thereby it takes along the lever strip via the swivel joint, whereby the latch is not affected, because the bolt of the connection of the latch can move in the elongated hole mentioned above. The advantage of this arrangement, however, is that during the rotary movement of the toggle lever from above the axis of rotation to below the axis of rotation, a vertex is passed, so that the toggle lever, which is initially pressed obliquely upwards via the lever strip or the latch, is pressed obliquely downwards by the latch and via the lever strip after passing the vertex.

This ensures automatic securing of the bolt of the ratchet in the working position. This is further enhanced if the toggle lever, relative to the axis of rotation and on the other side of the pivot, has an extension with a nose which closes off some of the slotted link above the bolt to be secured and, if necessary, also presses on this bolt. This nose means an additional security for the locking of the ratchet, even if it is not occupied by a component.

To release this lock, it is sufficient to press the toggle lever or the swivel joint together with the lever strip upwards by hand or by means of any actuating element, so that the vertex is again passed over and the toggle lever is returned to its initial position.

To support the locking by the toggle lever, it may still be advisable to provide a slider on the rack part, which is vertically movable against the swivel joint and rotates the toggle lever over the vertex relative to the axis of rotation.

In the second embodiment of the invention, the bolt is also guided in a slotted link in at least one of the side walls, wherein at least one of the slotted links continues in a bag-shaped recess into which the bolt can enter, for example under the pull of a force accumulator. For this purpose, the slotted link is thus situated curved in a certain radius around the axis of rotation of the last ratchet, while the end of the slotted link passes into the recess facing this axis of rotation.

However, such a guide of the bolt is necessary in only one sidewall; in the opposite side wall, of course, a slotted link of the same type can be formed, but without a recess. Of course, this recess is possible. At least this recess is designed in such a way that tilting of the bolt is possible when the opposite end of the bolt moves into or out of the recess.

An unlocking unit is now assigned to this locking unit in such a way that it pushes the bolt out of the recess when the unlocking event occurs. This is done by allowing the unlocking unit to be moved between the two sidewalls and thereby pressing on the bolt with a sloping shoulder so that the bolt is pushed out of the recess.

A preferred embodiment of the present invention thus also relates to the fact that the locking unit and unlocking unit are designed separately but integrated within the sidewalls, so that no outwardly interfering components are present. Both locking and unlocking occurs only in a very limited upper range of the rack or stacking column and take up extremely little space. However, the present invention also includes, of course, that the unlocking unit can operate outside the sidewalls.

The movement of the unlocking unit preferably takes place against the force of a force accumulator, which moves the unlocking unit back into its rest position. This force accumulator is suppose to be connected to the unlocking unit on the one hand and to the rack on the other hand.

To enable the unlocking unit to remain in the rest position, a latch is assigned to it for fixing. This latch is preferably actuated by the upper ratchet or an intermediate hold-down ratchet, so that it can be moved by this upper ratchet or a separate hold-down ratchet from its latched position to a position in which the unlocking unit is free.

A particular focus of the present invention is that actuation of the unlocking unit is performed completely contactless. This is achieved by the fact that a magnet is intended in or on the unlocking unit, which can be addressed by an unlocking device. For this purpose, the unlocking device also has a magnet of the same polarity, so that the two magnets repel each other. It is of course also conceivable that, for example, a carrier for a magnet is integrated above the unlocking unit between the sidewalls, which can be correspondingly electrically magnetized. The same applies, of course, to the magnet in the unlocking unit. Of course, other drives for the unlocking unit are also conceivable, for example the unlocking unit can also be operated manually or with an unlocking unit on the gripper (pin).

DETAILED DESCRIPTION OF THE FIGURES

Figure 2:
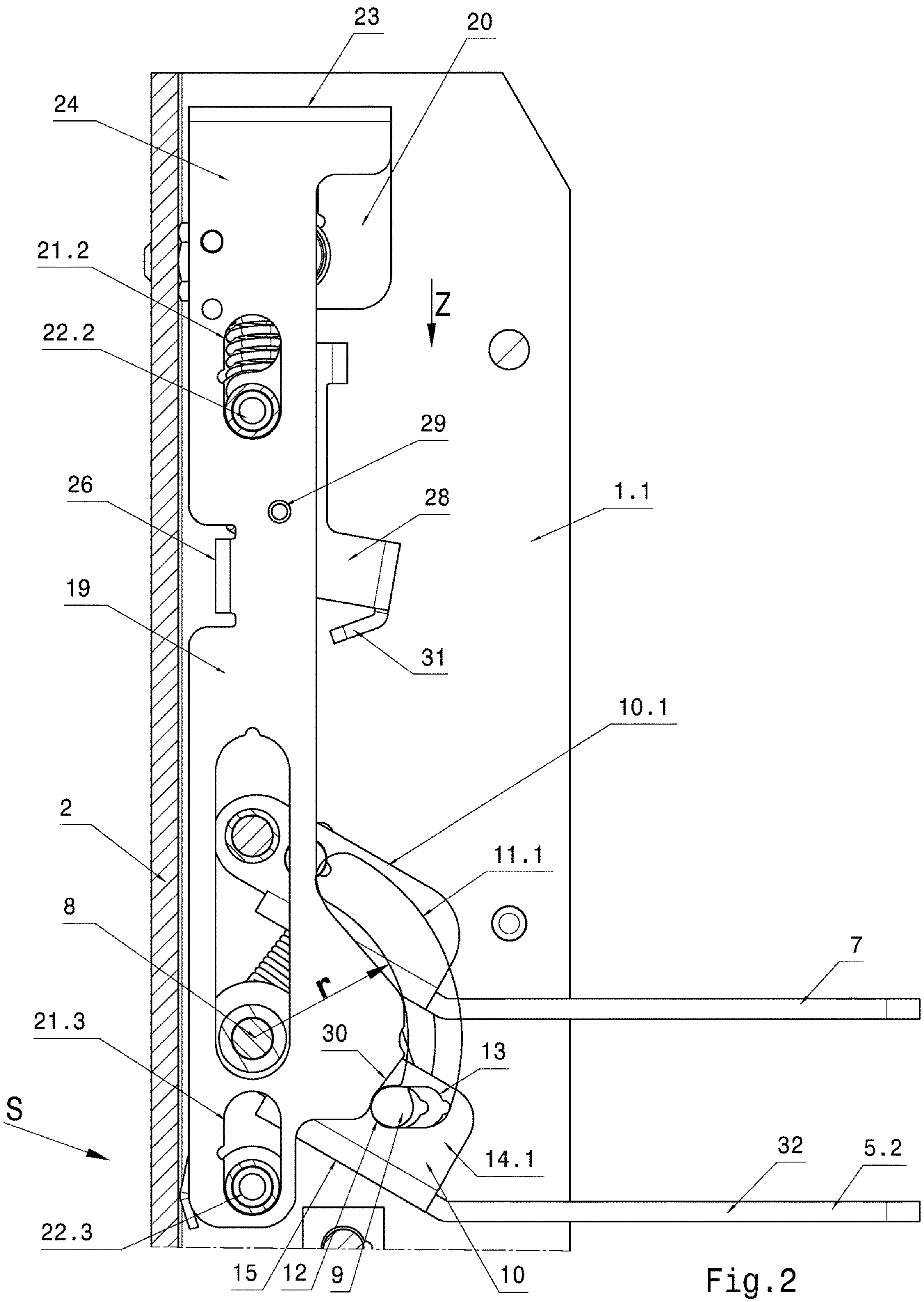
Figure 3:
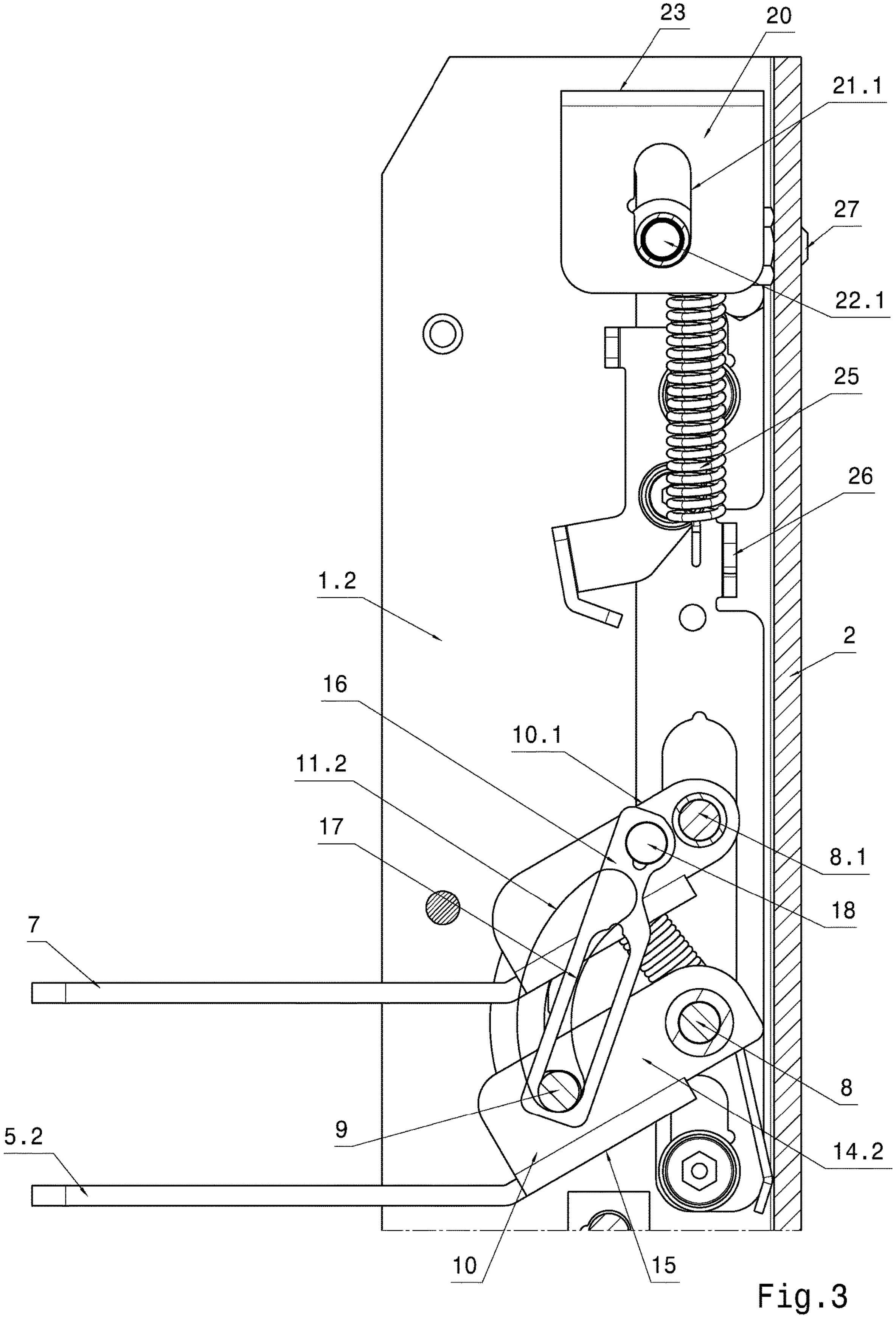
Figure 4:
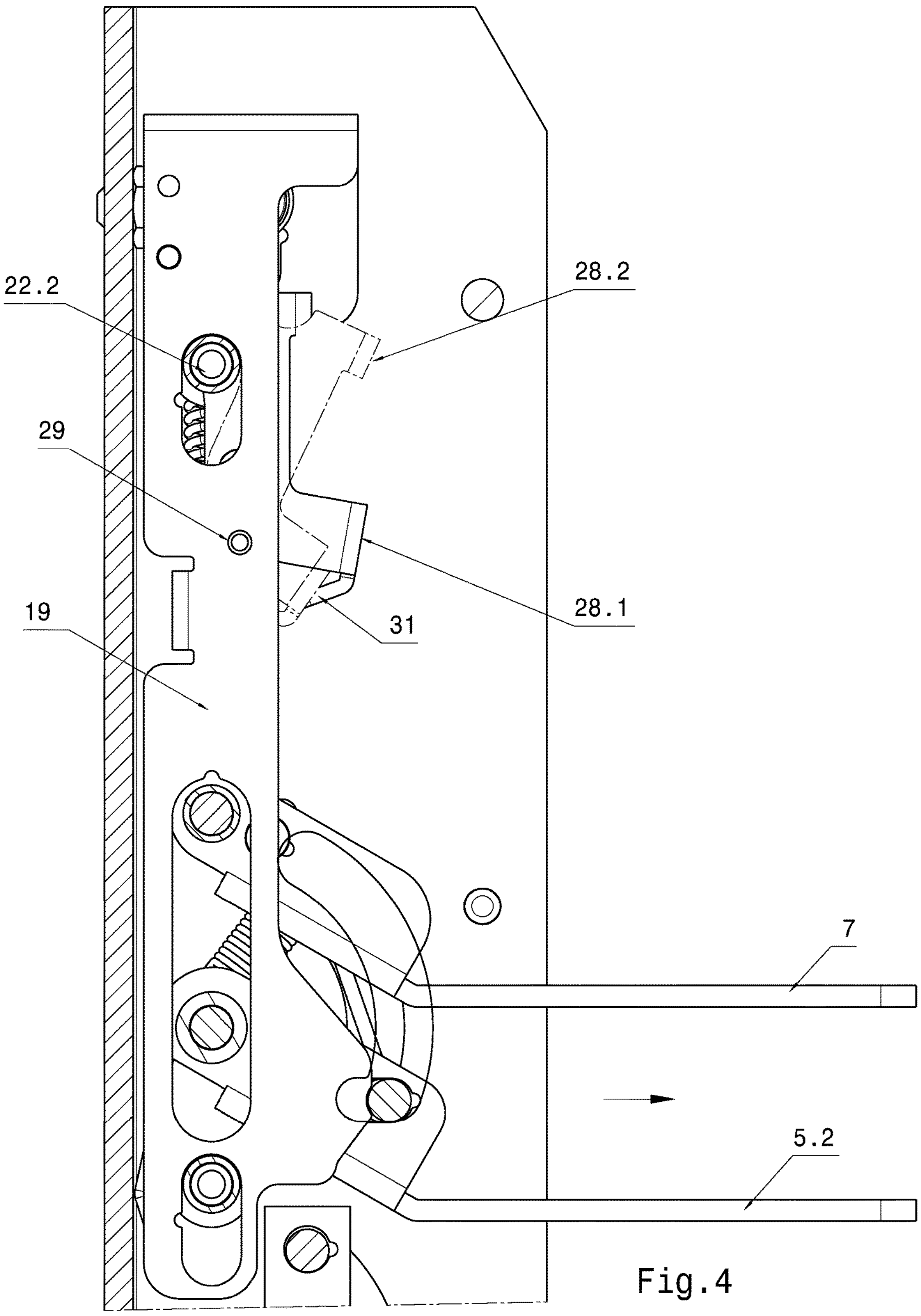
Figure 5:
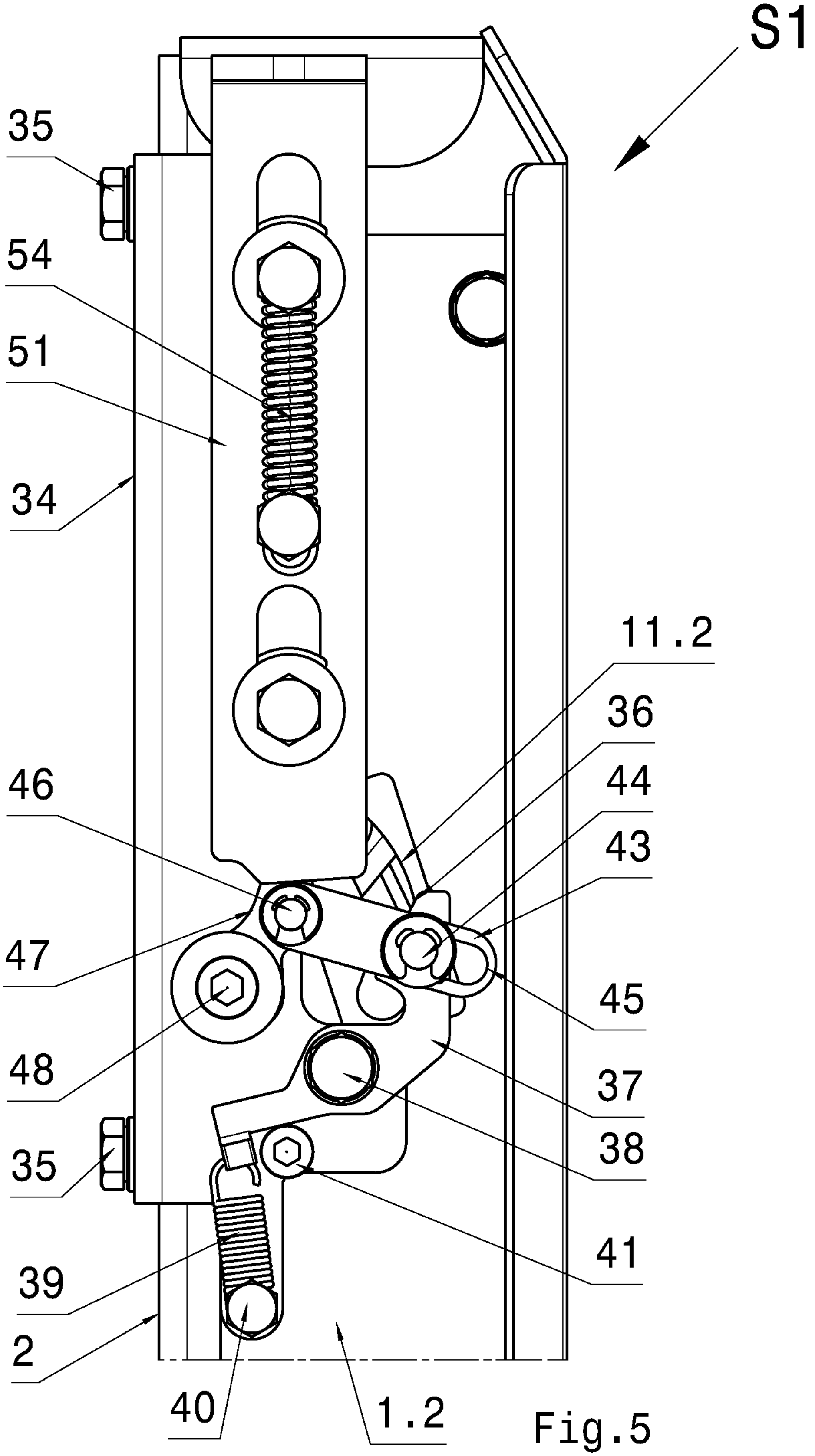
Figure 6:
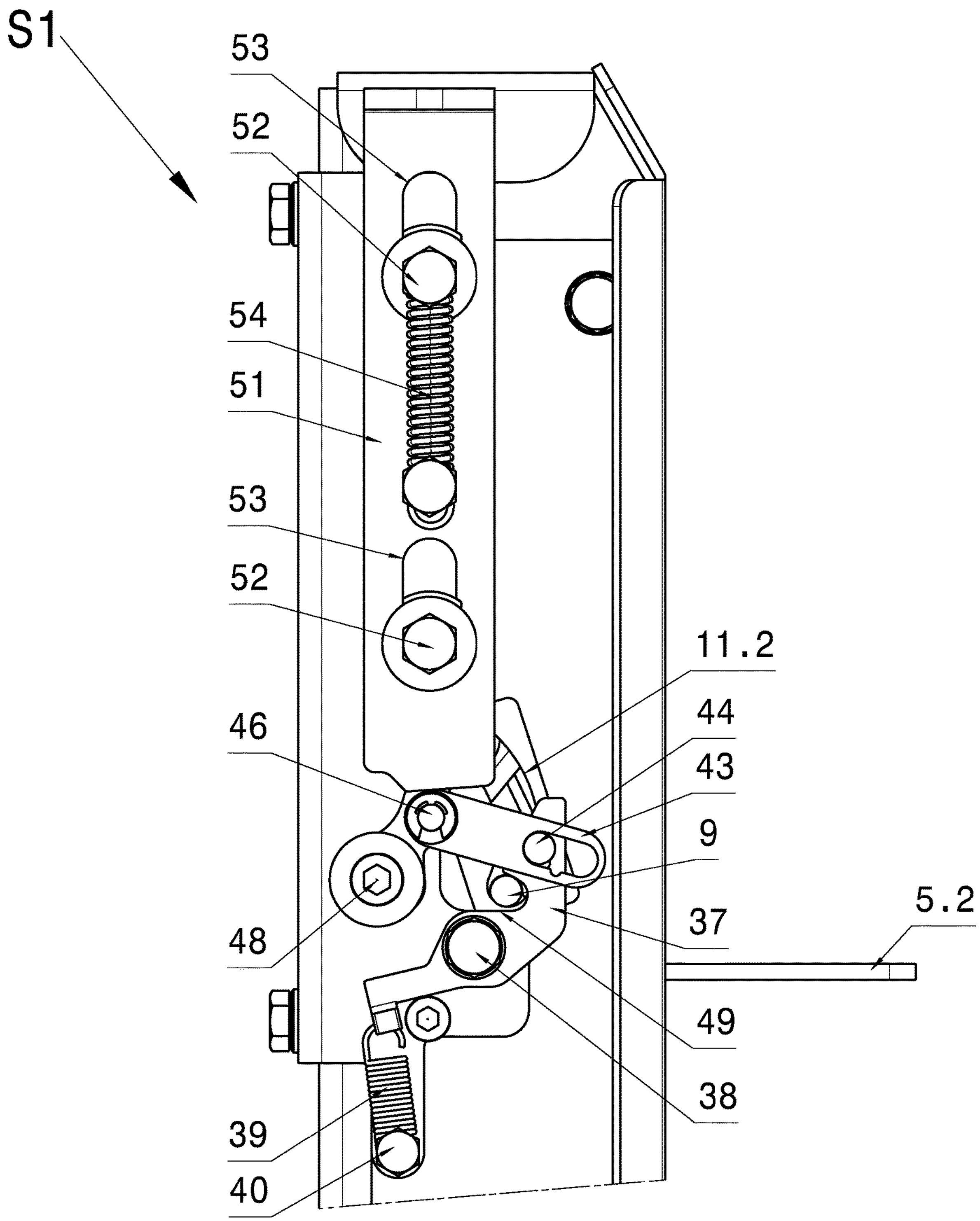
Figure 7:
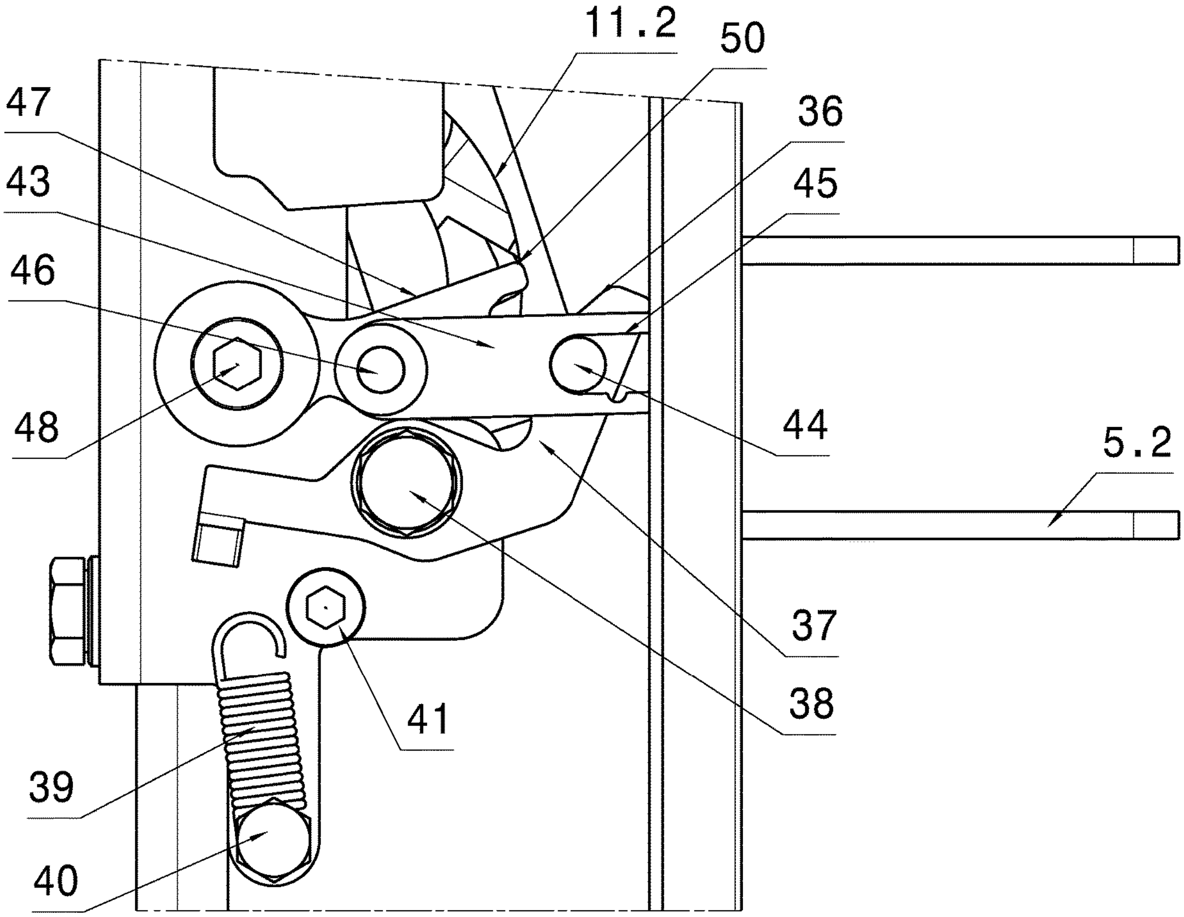
Figure 8:
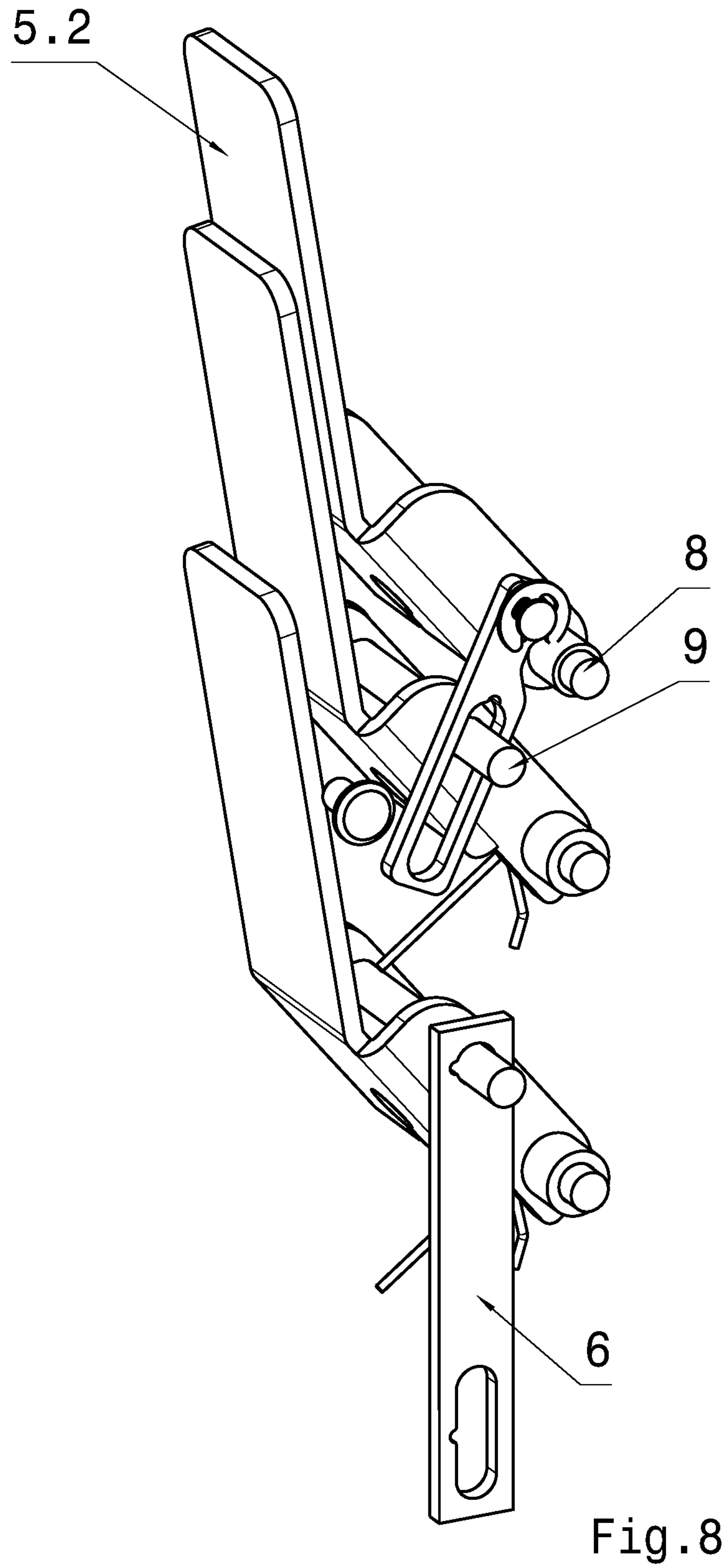

Further advantages, features and details of the invention result from the following description of preferred embodiment and from the drawing; these show in FIG. 1 a side view of a stacking column according to the invention with one sidewall removed;

FIG. 2 a side view of an enlarged upper range of the stacking columns according to FIG. 1;

FIG. 3 a side view of the upper range of the stacking columns according to FIG. 2 rotated by 180 degrees;

FIG. 4 a further enlarged side view of the upper range of the stacking columns according to FIG. 2;

FIG. 5 an enlarged section of a further embodiment of a stacking column with a variant of a locking/unlocking unit in the initial position;

FIG. 6 the enlarged section according to FIG. 5 of a further embodiment of the stacking column in locked working position;

FIG. 7 the enlarged section shown in FIG. 5 in opening position;

FIG. 8 a perspective view of some parts of a linkage for moving ratchets.

FIG. 1 shows a stacking column S, in which a plurality of ratchets 5 are located between two sidewalls 1.1 and 1.2, wherein the second sidewall 1.2 is shown in FIG. 3. Both side walls 1.1 and 1.2 are connected via a back wall 2 to form a cross-sectionally U-shaped profile 3. This profile 3 sits on a base plate 4.

With regard to the arrangement of the ratchets and their operation, additional reference is made in particular to the DE 20 2020 104 669 U1. In the present embodiment, the lowest ratchet 5.1 is also in the working position, in which it can hold a load. Via a linkage 6, the lowermost ratchet 5.1 is connected to the subsequent ratchets, which are in the stand-by position and in the rest position. Essential to the present invention is the uppermost ratchet 5.2 and a hold-down ratchet 7 assigned to it.

According to FIG. 2, the uppermost ratchet 5.2, when loaded, rotates about an axis of rotation 8 extending between the two sidewalls 1.1 and 1.2. Thereby the ratchet 5.2 is also guided by a bolt 9, which on the one hand passes through a rear part 10 of the ratchet 5.2 and is additionally guided in two slotted links 11.1 and 11.2 arranged in a radius r around axis of rotation 8 in the sidewalls 1.1 and 1.2. Thereby it is under the pull of a helical spring not shown in more detail, which pulls it towards the back wall 2. Thereby, the bolt 9 slides into a bag-shaped recess 12 of the slotted link 11.1 at one end in the working position of the ratchet 5.2, wherein the bolt 9 moves in a short elongated hole 13 of the rear part 10 extending at any angle.

The rear part 10 also consists of a short U-shaped profile, wherein two side strips 14.1 and 14.2 (see FIG. 3) are connected to each other by a bottom strip 15 formed as a continuation of a supporting strip 32. However, the elongated hole 13 is only formed in one side strip 14.1, in the other strip 14.1 the bolt 9 is only tilted, wherein the corresponding slotted link 11.2 gives it sufficient space. When the bolt 9 is retracted into the bag-shaped recess 12, the ratchet 5.2 is locked in the working position, wherein bolt 9, slotted link 11.1, elongated hole 13 and recess 12 together can be referred to as the locking unit.

When the ratchet 5.2 moved into the working position, it entrained the hold-down ratchet 7 via a connecting strip 16 as shown in FIG. 3, so that this hold-down ratchet 7 now covers the stored good. The connecting strip 16 is connected at one end to the bolt 9, wherein the latter passes through an elongated hole 17 in the connecting strip 16. At the other end, the connecting strip 16 has an eccentric connection 18 with a rear part 10.1 of the hold-down ratchet 7, so that this hold-down ratchet 7 makes an approximately double path around its axis of rotation 8.1, wherein the axis of rotation 8.1 lies on the vertical connecting line of all axes of rotation, of all ratchets, including the axis of rotation 8 of the ratchet 5.2. This double path allows the hold-down ratchet 7 to overlap the stored good.

If stored good is to be removed, the ratchet 5.2 must be unlocked. A slider 19 is provided between the two sidewalls 1.1 and 1.2 for unlocking the bolt 9. This slider 19 has a short strip 20 along the side wall 1.1, which has a vertical elongated hole 21.1 along which a stop 22.1 is guided, which projects from the side wall 1.1 into the interior of the profile 3.

Via an upper plate 23, the short strip 20 is connected to an elongated strip 24, which has two further elongated holes 21.2 and 21.3, in each of which a stop 22.2 and 22.3 is guided. These stops 22.2 and 22.3 project from the sidewall 1.2 into the interior of the profile 3.

A movement of the slider 19 in vertical direction z is possible against the force of a helical spring 25, which is fixed at one end in a lug 26 on the slider 19 and at the other end on a stationary fastening element 27, which projects inwards from the back wall 2 of the profile 3.

As shown in FIGS. 2 and 3, a latch 28, which is connected to the slider 19 so as to be rotatable about an axis 29, strikes the longitudinal strip 24 from the inside. This latch 28 can assume two positions, as indicated in FIG. 4. In the position 28.1 indicated with solid lines, the latch engages under the stop 22.2 so that the slider 19 cannot move against the direction z. In this position, the latch 28 is turned by a spring or the like, not shown, towards the back wall 2 until, as shown in FIG. 4, the latch engages under the stop 22.2. The slide 19 is thus locked. The unlocking process is described in more detail in the operating mode.

In the position 28.2 indicated by the dotted line, the latch 28 is pivoted about the axis 29 so that it no longer engages under the stop 22.2 and the slider 19 is free to move against the direction z, wherein this movement is performed by the force of the helical spring 25 until the stops 22.1, 22.2 and 22.3 are in the lower range of their elongated holes 21.1 to 21.3.

The functioning of the present invention is as follows:

As shown in FIG. 2, the stacking column S or its ratchets are loaded with the corresponding load until the last ratchet 5.2 is also in its working position. In this position, the bolt 9 moves into the bag-shaped recess 12 and the hold-down ratchet 7 covers the stored good.

If load is now to be removed and the stacking column S is to be unlocked, a corresponding robot approaches with a magnetic finger and grips the upper plate 23, in which a magnet not shown is located with the same pole direction as that of the magnet on the robot. Both magnets repel each other, so that the slider 19 is moved downward in the direction of movement z. Thereby the bolt 9 runs off a shoulder 30 (see FIG. 2) on the slider 19, which is inclined in such a way that the bolt 9 is forced out of the bag-shaped recess 12 back into the range of its slotted link 11.1.

The bolt 9 now moves upwards in the slotted link 11.1 under the force of a spring not shown, thereby taking the hold-down ratchet 7 with it. This hold-down ratchet 7 strikes with its rear part 10.1 against a corresponding nose 31 of the latch 28 and turns the latter from its latch position 28.1—shown solid—into the position 28.2—shown dotted—in which the slider 19 is cleared and can now move back into its initial position. The functional elements on the slider 19 can collectively be referred to as an unlocking unit.

FIGS. 5 to 7 show a further embodiment of a stacking column S1 according to the invention with a modified locking and unlocking unit. The preceding description of FIGS. 1 to 4 of the first embodiment serves as the basis for the explanation of this stacking column S1. The essential difference to the first embodiment lies in the combination of locking unit and unlocking unit, wherein the corresponding functional elements are situated together on an angular rack part 34, which is placed on the stacking column S1 from the outside and is connected to it by corresponding fastening elements 35. This rack part 34 overlaps some of the side-walls 1.2 and the back wall 2. The last ratchet 5.2 can be seen emerging from the stacking column S1 towards the front.

An entire ratchet string, shown in FIG. 8, is located between the two side walls and thus behind the side wall 1.2 shown here, wherein only the last ratchet 5.2 emerging from the side walls is shown in FIGS. 6 and 7. However, the bolt 9 can be seen, which is guided in the slotted link 11.2 of the sidewall 1.2. As the ratchet 5.2 pivots, the bolt 9 slides along the slotted link 11.2 until it reaches a position at the end of the slotted link 11.2 shown in FIG. 6. This is the working position of the ratchet 5.2, in which the ratchet 5.2 is loaded with a stacked product.

On its way to this working position, the bolt 9 meets a shoulder 36 of a latch 37 and slides along this sloping shoulder 36, wherein the latch 37 rotates about an axis of rotation 38. This rotation takes place against the force of a helical spring (force accumulator 39), which is hooked at one end into a hook 40 on the latch 37 and at the other end is connected to the rack part 34 via a screw 40. The movement of the latch 37 is limited by a stop 41.

At the other end of the axis of rotation 38, the latch 37 has a connection to a lever strip 43, wherein a bolt 44 is intended for this purpose, which passes through an elongated hole 45 in the lever strip 43.

The lever strip 43 is in turn connected via a swivel joint 46 to a toggle lever 47, which forms an axis of rotation 48 with the rack part 34 about which it can rotate.

The functioning of the present invention is as follows:

As soon as the latch 5.2 is loaded, it rotates about its axis of rotation 8 so that the bolt 9 hits the shoulder 36 of the latch 37 and thus rotates the latch 37 about the axis of rotation 38. This continues until the latch 37, which until now has partially covered the slotted link 11.2, is deflected out of the range of the slotted link 11.2 and the bolt 9, which can be seen in FIG. 6, strikes the end of the slotted link 11.2. In this position, the latch 37 snaps with a recess 49 via the bolt 9 and thus locks this bolt 9 in the slotted link 11.2. This prevents a rotary movement of the ratchet 5.2.

During the rotary movement of the latch 37 about the axis of rotation 38, the latch 37 takes the bolt 44 in the elongated hole 45 of the lever strip 43 with it until the latter strikes the other end of the elongated hole 45 and pulls the lever strip 43 to the right, but this also moves the swivel joint 46. Under the pull of the lever strip 43, the swivel joint 46 and with it the toggle lever 47 rotate about the axis of rotation 48, wherein a nose 50 passes over the slotted link 11.2 and, in the end position according to FIG. 7, covers and additionally locks the bolt 9. The rest position of the bolt 9 in the recess

49 is thereby unaffected by this rotary movement, since the bolt 44 slides in the elongated hole 45.

The movement of the swivel joint 46 is supported or triggered by a slider 51, which slides along the rack part 34, guided by guide pins 52, in an elongated hole 53. This slider 51 encounters the swivel joint 46 during its downward movement and rotates the toggle lever 47 about the axis of rotation 48 via the swivel joint 46 from a position above the axis of rotation 48 to a position below the axis of rotation 48, so that a force vertex is overcome here. Via the bolt 44 in the elongated hole 45, the latch 37 presses the lever strip 43 upward at an angle above the axis of rotation 48, but downward at an angle below the axis of rotation 48, so that as a result the toggle lever 47 remains in its latch position even when the pressure on the slider 51 is released. The slider 51 returns to its starting position under the tension of a helical spring 54.

For unlocking, only the vertex position between bolt 44, swivel joint 46 and axis of rotation 48 must be overcome, wherein this can be done by means of any devices which ensure that the swivel joint 46 is raised slightly via the axis of rotation 48. As can be seen in FIG. 7, when the vertex is overcome, the latch 37 is also deflected so that the bolt 9 is also cleared and the latch 5.2 can return to its rest position.

REFERENCE SYMBOL LIST

| | |
|---|---|
| 1 | side wall |
| 2 | back wall |
| 3 | profile |
| 4 | base plate |
| 5 | ratchet |
| 6 | linkage |
| 7 | hold-down ratchet |
| 8 | axis of rotation |
| 9 | bolt |
| 10 | rear part |
| 11 | slotted link |
| 12 | recess |
| 13 | elongated hole |
| 14 | side strip |
| 15 | bottom strip |
| 16 | connecting strip |
| 17 | elongated hole |
| 18 | eccentric connection |
| 19 | slider |
| 20 | short strip |
| 21 | elongated hole |
| 22 | stop |
| 23 | upper plate |
| 24 | elongated strip |
| 25 | helical spring |
| 26 | lug |
| 27 | fastening element |
| 28 | latch |
| 29 | axis |
| 30 | shoulder |
| 31 | Nose |
| 32 | supporting strip |
| 33 | |
| 34 | rack part |
| 35 | fastening element |
| 36 | shoulder |
| 37 | latch |
| 38 | axis of rotation |
| 39 | force accumulator |
| 40 | screw |
| 41 | stop |
| 42 | |
| 43 | lever strip |
| 44 | bolt |
| 45 | elongated hole |
| 46 | swivel joint |

-continued

| | |
|---|---|
| 47 | toggle lever |
| 48 | axis of rotation |
| 49 | recess |
| 50 | nose |
| 51 | latch |
| 52 | bolt |
| 53 | elongated hole |
| 54 | helical spring |
| r | radius |
| S | stacking column |
| z | direction of movement |

I claim:

1. Rack for storing workpieces in ratchet columns with side walls (1.1, 1.2), between which movable ratchets (5) are arranged which serve to hold the workpieces, wherein the ratchets (5) can be brought from a rest position into a working position in which they hold the workpiece, and a locking/unlocking unit is assigned to the last ratchet (5.2), wherein the locking is affected by a rotary movement of the last ratchet (5.2) into its working position, characterized in that the rotary movement of the last ratchet (5.2) entrains a bolt (9) which is received by a recess (12, 49) when the working position is reached, the bolt (9) is overlapped by a recess (49) of a latch (37) when reaching the working position, and the latch (37) rotates about an axis of rotation (38) against the force of a force accumulator (39), and the force accumulator (39) is connected to the latch (37) at one end of the axis of rotation (38), while the latch (37) has a connection to a lever strip (43) at the other end of the axis of rotation (38).

2. Rack according to claim 1, characterized in that the bolt (9) moves into a recess (12) when the working position is reached.

3. Rack according to claim 1, characterized in that the recess (49) is between the connection and the axis of rotation (38).

4. Rack according to claim 1, characterized in that the connection comprises a bolt (44) guided in an elongated hole (45) in the lever strip (43).

5. Rack according to claim 1, characterized in that the lever strip (43) is connected to a toggle lever (47) via a swivel joint (46).

6. Rack according to claim 5, characterized in that the toggle lever (47) is fixedly and rotatably situated on a rack part (34).

7. Rack according to claim 5, characterized in that the swivel joint (46) pivots from a position above an axis of rotation (48) of the toggle lever to a position below the axis of rotation (48) of the toggle lever during its rotation about the axis of rotation (48) of the toggle lever (47).

8. Rack according to claim 7, characterized in that the connection of the latch (37) presses on the swivel joint (46) both above the axis of rotation (48) of the toggle lever and below said axis of rotation (48) of the toggle lever.

9. Rack according to claim 5, characterized in that the toggle lever (47) has an extension with a nose (50) relative to the axis of rotation (48) of the toggle lever and on the other side of the swivel joint (46).

10. Rack according to claim 9, characterized in that the nose (50) engages over the bolt (9) in the locking position.

11. Rack according to claim 5, further comprising a slider (51) that rotates the swivel joint (46) about the axis of rotation (48) of the toggle lever.

12. Rack according to claim 1, characterized in that the locking and unlocking unit with the latch (37), the lever strip (43) and the toggle lever (47) as well as the slider (51) are situated on a rack part (34), which is separately attached from the outside to the side wall (1.2).

13. Rack according to claim 1, characterized in that the bolt (9) is situated inside the two sidewalls (1.1, 1.2).

14. Rack according to claim 1, further comprising a hold-down ratchet (7) which the performs a locking and/or unlocking function of the upper ratchet (5.2).

15. Rack for storing workpieces in ratchet columns with side walls (1.1, 1.2), between which movable ratchets (5) are arranged which serve to hold the workpieces, wherein the ratchets (5) can be brought from a rest position into a working position in which they hold the workpiece, and a locking/unlocking unit is assigned to the last ratchet (5.2), wherein the locking is affected by a rotary movement of the last ratchet (5.2) into its working position, characterized in that the rotary movement of the last ratchet (5.2) entrains a bolt (9) which is received by a recess (12, 49) when the working position is reached, and characterized in that the bolt (9) is guided in a slotted link (11) in at least one of the sidewalls (1.1), which is adjoined by the recess (12) extending approximately vertical to the slotted link (11) for receiving the bolt (9), and wherein the recess (12) is a bag-shaped recess (12).

16. Rack according to claim 15, characterized in that the bolt (9) can be pushed into the recess (12) by a force accumulator.

17. Rack according to claim 15, characterized in that the bolt (9) can be pushed out of the recess (12) by the unlocking unit.

18. Rack according to claim 17, characterized in that the unlocking unit is a slider (19) movable along the sidewalls (1.1, 1.2).

19. Rack according to claim 18, characterized in that the slider (19) is movable between the two sidewalls (1.1, 1.2).

20. Rack according to claim 17, characterized in that the unlocking unit has a shoulder (30) which abuts against the bolt (9).

21. Rack according to claim 17, characterized in that, during unlocking, the unlocking unit is under the pull of a force accumulator (25) which is connected, on the one hand, to the unlocking unit and, on the other hand, to the rack in a stationary manner.

22. Rack according to claim 17, characterized in that the unlocking unit is assigned a latch (28) for fixing the unlocking unit.

23. Rack according to claim 22, characterized in that this latch (28) can be actuated by the upper ratchet (5.2).

24. Rack for storing workpieces in ratchet columns with side walls (1.1, 1.2), between which movable ratchets (5) are arranged which serve to hold the workpieces, wherein the ratchets (5) can be brought from a rest position into a working position in which they hold the workpiece, and a locking/unlocking unit is assigned to the last ratchet (5.2), wherein the locking is affected by a rotary movement of the last ratchet (5.2) into its working position, characterized in that the rotary movement of the last ratchet (5.2) entrains a bolt (9) which is received by a recess (12, 49) when the working position is reached, and characterized in that the unlocking unit is magnetically operable.

25. Rack according to claim 24, characterized in that the unlocking unit is assigned a magnet which cooperates with a magnet of the same polarity on an unlocking device.

* * * * *